Feb. 20, 1951  F. G. FIRTH  2,542,075
MAGNETOSTRICTIVE DEVICE
Filed May 14, 1948
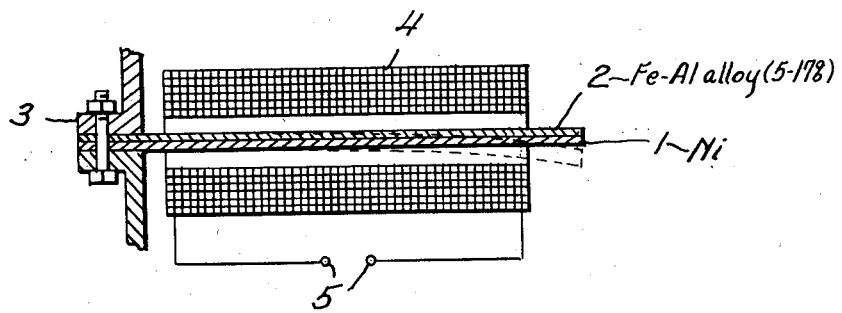
INVENTOR
Francis George Firth
BY
Pennie, Edmonds, Morton + Barrows
ATTORNEYS Patented Feb. 20, 1951

2,542,075

UNITED STATES PATENT OFFICE 2,542,075

MAGNETOSTRICTIVE DEVICE

Francis George Firth, New York, N. Y.

Application May 14, 1948, Serial No. 27,095

2 Claims. (Cl. 171—209)

This invention relates to magneto-strictive devices, and has for its object the provision of an improved magneto-strictive device. More particularly, the invention contemplates, as a new article of manufacture, a composite unit having magneto-striction properties made of magneto-strictive elements of opposite coefficients of magneto-striction. A further object of the invention is the provision of a novel magneto-strictive device embodying the composite unit of the invention in association with means for applying thereto a magnetic field.

Applications of the principle of magneto-striction in sensitive instrumentation and power transducers have up to now utilized in most cases the negative magneto-strictive properties of nickel. That is, the facility that nickel metal and certain alloys of high nickel content have to constrict, when a magnetic field is applied along its length. Upon removal of the field, the nickel will resume its original length.

Certain positive magneto-strictive metals are also known, which include cast cobalt, and certain iron alloys. Among such alloys having pronounced positive magneto-strictive properties are iron-aluminum alloys containing between about 5% and 17% aluminum. That is, if a magnetic field be applied longitudinally to a strip of such an alloy, it will increase in length. Upon removal of the magnetic force, the strip will resume its original length.

For purposes of illustration only, two magneto-strictive elements are herein employed to describe the principle of the invention and a preferred embodiment thereof, namely nickel and an iron-aluminum alloy having an aluminum content of about 13.4%. Nickel (including copper and other alloys of high nickel content such as Monel metal) is to be understood as representative of elements having a negative magneto-strictive coefficient, and the iron-aluminum alloy as representative of elements having a positive magneto-strictive coefficient. Cast cobalt and iron-aluminum alloys containing from about 5% to 17% aluminum are other known positive magneto-strictive metals, and iron and cobalt are other known negative magneto-strictive metals.

If a pair of magneto-strictive elements, one with a positive coefficient of magneto-striction and the other with a negative coefficient of magneto-striction, be rigidly secured together to form a combined or composite unit, and a magnetic field is applied along the length of the composite unit a bending movement will be produced, due to the differential movements of the two magneto-strictive elements. Thus, instead of longitudinal movement being produced, as with each uncombined element, the resultant will be translated to a lateral displacement of the composite unit. In other words, the composite unit will bend under the influence of a magnetic field applied along its length. When an alternating magnetic field is placed along such a rigidly united pair of magneto-strictive elements, the combined element, if held rigid at one end, will vibrate laterally with maximum displacement at the far or free end. The frequency of vibration will be a function of the frequency of excitation, and the magnitude of the displacement, will be some function of the magnetic field strength.

In a preferred embodiment of the invention, a suitable flat sheet of an iron-aluminum alloy with 13.4% aluminum content is electroplated with a thick deposit of nickel metal of a suitable thickness, and the whole heat-treated, and passed through a rolling mill, until the required combined and individual thicknesses of nickel, and iron-aluminum alloy are obtained. The sheet can then be cut, stamped, or pressed into any desired shape, suitable for a particular construction.

An alternate method of manufacture consists of the continuous welding of the iron-aluminum alloy strip with a strip of nickel, under a protective atmosphere. A further alternate manufacturing method involves the brazing of the iron-aluminum alloy and nickel strip together, in a suitable furnace with a hard solder, copper, or other bond.

There are two fundamental methods of utilizing the unique properties of such a bi-metallic construction, namely, (a) as an electro-magnetic driven transducer, (b) as a driven electro-magnetic pick up.

In method (a), the bi-metallic unit is subjected to a magnetic field along its length, that may or may not be alternating in nature. Thus, if the field be electro-magnetic, the electrical energy is transformed into mechanical energy, which is represented by the production of a bending force in the bi-metallic unit. Such a unit, with appropriate design, has a wide variety of applications, as will be apparent to those skilled in the art. Some of these applications include loud speakers, phonographic recording cutting heads, ultrasonic devices, modulators, frequency generators, and stabilizing devices.

In method (b), the bi-metallic element is driven, and the electro-magnetic coil surrounding the elements, has induced in it, a small current due to the bending moment which is applied to the element. This small induced current can be amplified with suitable apparatus, and the output current applied in the manner familiar to those acquainted with the art. Some such applications would include the use of such a device in strain gauges, vibration analyzers, phonograph recording pickup heads, microphones, and surface analyzers.

The single figure of the accompanying drawing diagrammatically illustrates a bi-metallic magneto-strictive unit in which the lower element 1 is nickel and the upper element 2 is the aforementioned iron-aluminum alloy. One end of the bi-metallic unit is rigidly held in a stationary clamp 3. An electro-magnetic coil 4 surrounds the bimetallic unit. The coil has electric conductor terminals 5 adapted to be connected to a suitable source of electric energy.

The normal position of the bi-metallic unit is horizontal, as shown in the figure. When the terminals 5 are connected to a suitable source of electric energy, the resultant electric current flowing in the coil 4 will produce a magnetic field along the bi-metallic unit, and under the influence of this magnetic field the unit will bend and assume a position indicated by the dotted lines in the figure. Upon removal of the magnetic field, by interrupting the electric current flow in the coil 4, the bi-metallic unit will return to its original horizontal position. This bending movement of the bi-metallic unit may be utilized in various industrial and practical applications of the invention hereinbefore grouped under method (a).

By mechanically or otherwise rapidly moving the bi-metallic unit from its normal horizontal position to the dotted line position indicated in the figure (or vice versa), an electric current will be inducted in the coil 4, and by connecting the terminals 5 to a suitable instrumentality this induced electric current may be utilized in those practical applications of the invention hereinbefore grouped under method (b).

When the coil terminals 5 are connected to a source of alternating current electric energy, the composite magneto-strictive unit (1—2) will vibrate with a frequency dependent upon the frequency of alternation of the magnetic field resulting from the flow through the coil 4 of the alternating electric current. This frequency may vary from 10 cycles per second up to 10 megacycles per second. The intensity of vibration will be dependent upon the strength of the magnetic field.

When the composite magneto-strictive unit is mechanically or otherwise rapidly moved back and forth, e. g. vibrated, an alternating or pulsating electric current will be induced in the coil, which may be utilized in actuating various instrumentalities responsive to such a current. The invention is not to be construed as being limited to a flat strip construction, but can comprise a composite or bi-metallic construction of the character aforementioned of any geometric shape.

I claim:

1. A magneto-strictive device comprising a bi-metallic unit made of an element of a metal of high nickel content rigidly secured to an element of an iron-aluminum alloy having an aluminum content of from about 5 to 17%, and means for applying a magnetic field to said bi-metallic unit.

2. As a new article of manufacture, a magneto-structive device comprising a bi-metallic unit made of an element of a metal of high nickel content rigidly secured to a second element of an iron-aluminum alloy having an aluminum content of from about 5 to 17%.

FRANCIS GEORGE FIRTH.

REFERENCES CITED

The following references are of record in the file of this patent:

UNITED STATES PATENTS

| Number | Name | Date |
|---|---|---|
| 1,882,399 | Pierce | Oct. 11, 1932 |

FOREIGN PATENTS

| Number | Country | Date |
|---|---|---|
| 322,446 | Great Britain | Dec. 3, 1929 |